United States Patent
Selvaraja

(10) Patent No.: US 9,632,248 B2
(45) Date of Patent: Apr. 25, 2017

(54) INTEGRATED PHOTONIC COUPLER

(71) Applicants: IMEC VZW, Leuven (BE); Universiteit Ghent, Ghent (BE)

(72) Inventor: Shankar Kumar Selvaraja, Ghent (BE)

(73) Assignees: IMEC VZW, Leuven (BE); Universiteit Gent, Ghent (BE)

( * ) Notice: Subject to any disclaimer, the term of this patent is extended or adjusted under 35 U.S.C. 154(b) by 0 days.

(21) Appl. No.: 14/580,029

(22) Filed: Dec. 22, 2014

(65) Prior Publication Data

US 2015/0285996 A1 Oct. 8, 2015

(30) Foreign Application Priority Data

Dec. 20, 2013 (EP) .................................... 13199256

(51) Int. Cl.
*G02B 6/12* (2006.01)
*G02B 6/124* (2006.01)
(Continued)

(52) U.S. Cl.
CPC ............ *G02B 6/124* (2013.01); *G02B 6/136* (2013.01); *G02B 6/30* (2013.01); *G02B 2006/12107* (2013.01); *G02B 2006/12176* (2013.01)

(58) Field of Classification Search
CPC .......... G02B 6/124; G02B 6/136; G02B 6/13; G02B 2006/12107; G02B 2006/12176
(Continued)

(56) References Cited

U.S. PATENT DOCUMENTS 6,788,863 B2 * 9/2004 Parker .................... B82Y 20/00
385/122
6,937,799 B2 * 8/2005 Matsushima ...... G02B 6/12004
385/129

(Continued)

FOREIGN PATENT DOCUMENTS

EP 2 634 605 A1 9/2013

OTHER PUBLICATIONS

"Subwavelength meta-structures for dispersion engineering in planar waveguide devices" by Halir et al. published in Proc. SPIE 8995, High Contrast Metastructures III, 89950U (Feb. 19, 2014.*
"Focusing-curved subwavelength grating couplers for ultra-broadband silicon photonics optical interfaces" by Zhong et al; Received May 15, 2014; revised Jun. 28, 2014; accepted Jul. 11, 2014; published Jul. 21, 2014 Jul. 28, 2014 | vol. 22, No. 15 | DOI:10.1364/OE.22.018224 | Optics Express 18225.*

(Continued)

*Primary Examiner* — Ryan Lepisto
*Assistant Examiner* — Guy Anderson
(74) *Attorney, Agent, or Firm* — McDonnell Boehnen Hulbert & Berghoff LLP

(57) ABSTRACT

The present invention relates to an integrated photonic device comprising a photonic substrate, and an integrated waveguide provided in or on this substrate. The waveguide is adapted for conducting radiation of a predetermined wavelength. The device further comprises a sub-wavelength grating optically connected to the waveguide, which provides a first periodic variation of the refractive index in at least one first spatial direction. The device also comprises a diffracting grating arranged over the sub-wavelength grating for coupling radiation of the predetermined wavelength in and/or out of the integrated waveguide via the sub-wavelength grating. The diffracting grating provides a second periodic variation of the refractive index in at least one second spatial direction. The first periodic variation has a first pitch that is less than half of the predetermined wavelength, while the second periodic variation has a second pitch that is at least half of the predetermined wavelength.

12 Claims, 6 Drawing Sheets

(51) Int. Cl.
*G02B 6/30* (2006.01)
*G02B 6/136* (2006.01)

(58) Field of Classification Search
USPC .............................................. 385/14–15, 37
See application file for complete search history.

(56) References Cited

U.S. PATENT DOCUMENTS

| | | | | |
|---|---|---|---|---|
| 7,680,371 | B2* | 3/2010 | Cheben | G02B 6/1228 385/124 |
| 7,929,815 | B2* | 4/2011 | Hofrichter | G02B 6/124 385/37 |
| 8,503,839 | B2* | 8/2013 | Cheben | G02F 1/365 385/129 |
| 8,842,363 | B2* | 9/2014 | Mathai | G02B 27/44 359/569 |
| 9,341,780 | B2* | 5/2016 | Beausoleil | G02B 6/30 |
| 2008/0193079 | A1* | 8/2008 | Cheben | G02B 6/1228 385/28 |
| 2010/0046901 | A1* | 2/2010 | Stoeferle | G02B 6/1225 385/129 |
| 2010/0119229 | A1* | 5/2010 | Roelkens | G02B 6/12007 398/79 |
| 2010/0265504 | A1 | 10/2010 | Kopp et al. | |
| 2012/0224810 | A1* | 9/2012 | Doerr | G02B 6/124 385/37 |
| 2012/0281950 | A1 | 11/2012 | Fattal et al. | |
| 2013/0136389 | A1* | 5/2013 | Luo | G02B 6/12007 385/11 |

OTHER PUBLICATIONS

European Search Report, European Patent Application No. 13199256.2, dated Jun. 27, 2014.
Chen, Xia et al., "Nanoholes Grating Couplers for Coupling Between Silicon-on-Insulator Waveguides and Optical Fibers", vol. 1, No. 3, Sep. 18, 2009, pp. 184-190.
Cheben, Pavel et al., "Refractive Index Engineering With Subwavelength Gratings for Efficient Microphotonic Couplers and Planar Waveguide Multiplexers", Optics Letters, vol. 35, No. 15, Aug. 1, 2010, pp. 2526-2528.
Halir, R. et al., "Single Etch Grating Couplers for Mass Fabrication With DUV Lithography", Opt. Quant. Electron., Feb. 24, 2012, 6 pages.
Chen, Xia et al., "Subwavelength Waveguide Grating Coupler for Fiber-to-Chip Coupling on SOI With 80nm 1 dB-Bandwidth", 2011 Conference on Lasers and Electro-Optics (CLEO), May 1-6, 2011, 2 pages.
Feng, Junbo et al., "High Efficiency Compact Grating Coupler for Integrated Optical Circuits", Proceedings of SPIE, vol. 6351, Jan. 1, 2006, pp. 1-9.
Zhou, Zhiping et al., "Compact Silicon Diffractive Components for Integrated Optics", Proceedings of SPIE, vol. 7218, Feb. 9, 2009, pp. 1-11.
Zhou, Zhiping et al., "Optimized Binary, Phase-Only, Diffractive Optical Element With Subwavelength Features for 1.55 um", Journal of the Optical Society of America A, vol. 12, No. 5, May 1, 1995, pp. 1104-1112.

* cited by examiner

INTEGRATED PHOTONIC COUPLER

CROSS-REFERENCE TO RELATED APPLICATION

Priority is claimed to European patent application 13199256.2 filed on Dec. 20, 2013, the contents of which are hereby incorporated by reference.

FIELD OF THE INVENTION

The invention relates to the field of photonic integrated circuits. More specifically it relates to systems and methods for coupling radiation between a chip and an optical fiber.

BACKGROUND OF THE INVENTION

Coupling radiation between an optical fiber and a photonic integrated circuit, such as a planar photonic circuit using silicon technology, can be challenging for several reasons. Three important challenges in light-chip coupling are achieving a good coupling efficiency between an optical fiber and the integrated circuit, achieving a high bandwidth, and dealing with implementation complexity.

Grating-based fiber-chip couplers may provide a versatile solution which is relatively simple to implement and allows wafer-scale optical testing. Various advantages of grating-based fiber-chip couplers include the freedom to place the coupler anywhere on the chip, no facet polishing requirement, and the ease of implementation of optional functionality such as power or polarization splitting.

In a conventional grating-based fiber-chip coupler as known in the art, a good light coupling in and out of a planar waveguide may be achieved by means of a grating for implementing a cyclic local effective refractive index modulation. For example, such grating may comprise a periodic line and space structure forming alternating high effective refractive index and low effective refractive index regions. The grating structure in couplers known in the art may for example be implemented by metallic lines, shallow-etched grooves or slanted grooves.

However, despite the practical advantages of state-of-the-art grating couplers, the operational bandwidth offered by such couplers may be relatively limited, and the coupler may be sensitive to input polarization. Furthermore, difficulties in achieving good fabrication tolerances in such couplers may also make them less attractive for industrial application.

Particular fiber-to-chip grating couplers known in the art comprise a sub-wavelength grating. For example, Chen and Tsang disclosed in "Nanoholes Grating Couplers for Coupling Between Silicon-on-Insulator Waveguides and Optical Fibers," published in IEEE Photonics Journal 1(3), a high-efficiency grating coupler for coupling between the TE mode of a nanophotonic wire waveguide and a single-mode optical fiber. This coupler uses an array of nanoholes instead of a conventional grating, and may thus be advantageously manufactured using the same photolithography mask and etching process as is used for the silicon-on-insulator waveguide. The sub-wavelength structures may reduce the effective refractive index step without substantially distorting the phase front of the propagating light wave, thus reducing losses by, for example, reflection off the grating. However, the coupling efficiency of such coupler may be limited by the directional nature of diffraction, which furthermore can be improved to some extent by adding a substrate mirror.

SUMMARY OF THE INVENTION

It is an object of embodiments of the present invention to provide efficient and good coupling of radiation into and out of an integrated photonic device, e.g., between an optical fiber and an integrated photonic device.

It is an advantage of embodiments according to the present invention that a high operating bandwidth can be achieved in a photonic coupler.

It is an advantage of embodiments according to the present invention that an integrated photonic coupler can be provided which is tolerant to fabrication imperfections.

It is an advantage of embodiments according to the present invention that a high operational bandwidth can be obtained in combination with a good efficiency and with a good tolerance to fabrication imperfections.

It is an advantage of embodiments of the present invention that obtaining a good efficiency and obtaining an appropriate or correct bandwidth can be decoupled from each other.

It is an advantage of embodiments of the present invention that on the same photonics platform, e.g., using the same substrate and layer materials and manufacturing processes, a coupler can be provided which is tuned to a specific bandwidth selected from a range of possible bandwidths.

It is an advantage of embodiments of the present invention that radiation coupling in and out of the photonic device, e.g., between an optical fiber and a chip, can be achieved with low reflection losses.

It is an advantage of embodiments of the present invention that radiation coupling can be achieved which can be easily integrated with advanced transistor geometries.

The above objective is accomplished by a method and device according to the present invention.

The present invention relates to an integrated photonic device, the integrated photonic device comprising a substrate, an integrated waveguide formed on the substrate, the integrated waveguide being adapted for conducting light of a predetermined wavelength, a sub-wavelength grating optically connected to the integrated waveguide, the sub-wavelength grating providing a first periodic variation of the refractive index in at least one first spatial direction, and a diffracting grating arranged above the sub-wavelength grating with respect to the substrate or partly etched in the sub-wavelength grating for coupling light of the predetermined wavelength in and/or out of the integrated waveguide via the sub-wavelength grating, the diffracting grating providing a second periodic variation of the refractive index in at least one second spatial direction, wherein the first periodic variation has a first pitch smaller than half of the predetermined wavelength, and the second periodic variation has a second pitch of at least half of the predetermined wavelength.

It is an advantage of embodiments of the present invention that a system is provided that allows coupling of radiation from and to an optical waveguide with a high bandwidth.

The sub-wavelength grating may be integrated in the integrated waveguide.

It is an advantage of embodiments of the present invention that highly integrated optical systems can be obtained.

The sub-wavelength grating may comprise nanoholes and/or trenches formed in the material of the integrated waveguide for locally lowering the effective refractive index with respect to light of the predetermined wavelength. It is an advantage of embodiments of the present invention that sub-wavelength processing techniques can be used which are known to the person skilled in the art, i.e., that use can be made of existing technology for generating the sub-wavelength grating.

The first pitch may vary as function of location such as to match the optical power profile of the sub-wavelength grating to the power profile of a mode of a fiber for feeding light into or receiving light from the integrated waveguide via the diffracting grating and the sub-wavelength grating.

It is an advantage of embodiments of the present invention that tuning can be performed for optimally matching the optical power profile of a mode of a fiber for which the system will be used.

The second pitch varies as function of location such as to match the optical power profile of the diffracting grating to the power profile of a mode of a fiber for feeding light into or receiving light from the integrated waveguide via the diffracting grating and the sub-wavelength grating.

It is an advantage of embodiments of the present invention that tuning can be performed for optimally matching the optical power profile of a mode of a fiber for which the system will be used.

The integrated photonic device may further comprise a reflective element arranged between the substrate and the sub-wavelength grating for reflecting a downward diffracted portion of light of the predetermined wavelength such as to constructively interfere with an upward diffracted portion of light of the predetermined wavelength. It is an advantage of embodiments of the present invention that coupling efficiency can be improved by providing additional elements in the photonics device.

The reflective element may comprise a distributed Bragg mirror.

The sub-wavelength grating may be adapted for conducting light of the predetermined wavelength through a medium having a waveguide effective refractive index and in which the first periodic variation is adapted for providing an effective refractive index lower than the waveguide effective refractive index.

The substrate may be part of a semiconductor-on-insulator, the integrated waveguide being formed in the semiconductor layer of the semiconductor-on-insulator layer.

The semiconductor layer may be a silicon layer, the integrated waveguide being a silicon waveguide.

The diffracting grating may be a metal line grating.

The present invention also relates to a method for manufacturing an integrated photonic device, the method comprising: (i) providing a substrate, the substrate having a buried oxide layer deposited thereon and a waveguide material layer on top of the buried oxide layer, (ii) providing an integrated waveguide in the waveguide material layer, the integrated waveguide being adapted for conducting light of a predetermined wavelength, (iii) forming a sub-wavelength grating optically connected to the integrated waveguide, the sub-wavelength grating providing a first periodic variation of the refractive index in at least one first spatial direction, and (iv) arranging a diffracting grating above the sub-wavelength grating with respect to the substrate or partly etched in the sub-wavelength grating for coupling radiation of the predetermined wavelength in and/or out of the integrated waveguide via the sub-wavelength grating, the diffracting grating providing a second periodic variation of the refractive index in at least one second spatial direction, wherein the first periodic variation has a first pitch smaller than half of the predetermined wavelength, and the second periodic variation has a second pitch of at least half of the predetermined wavelength.

Forming the sub-wavelength grating may comprise fully etching the waveguide in the waveguide material layer down to the buried oxide layer, with the buried oxide layer acting as etch stopping layer and the etching being in accordance with an etch pattern corresponding to the first periodic variation.

Providing a substrate may comprise providing a silicon-on-insulator and forming the integrated waveguide comprises forming a silicon waveguide. It is an advantage of embodiments of the present invention that known and easy processing steps can be applied.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
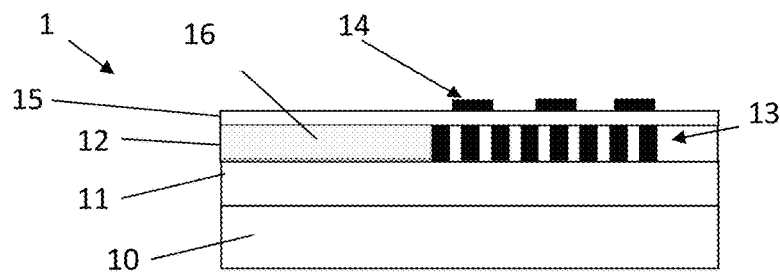
FIG. 1 shows a photonic integrated device according to embodiments of the present invention.

The drawings are only schematic and are non-limiting. In the drawings, the size of some of the elements may be exaggerated and not drawn on scale for illustrative purposes. Any reference signs in the claims shall not be construed as limiting the scope. In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Figure 12:
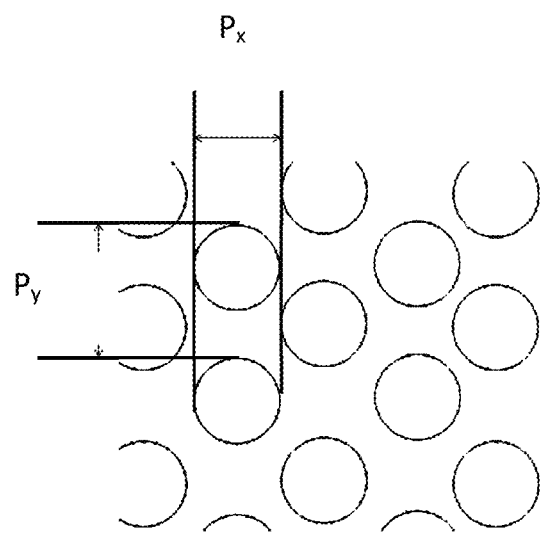
FIG. 12 illustrates the concept of pitch as used in embodiments of the present invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to a pitch, reference is made to the periodic spatial variation occurring in the grating. For a trench-like grating, the pitch typically is defined as the periodic distance between neighboring trenches. For a grating based on nanoholes, the pitch refers to the inter-distance between neighboring holes. For nanoholes, the inter-distance between neighboring holes does not typically need to be the same in all directions, and the pitch often is expressed for two perpendicular directions, e.g., along the major axes for the pattern wherein the nanoholes are arranged. By way of illustration, FIG. 12 shows an example of how pitch can be defined in the case of nanoholes. Nanoholes typically are arranged in an array, and the pitch may be defined for different directions, in the present case in the x and y directions. In the present example the pitch in the x direction $P_x$ is about equal to the diameter of the nanohole, whereas the pitch in the y direction $P_y$ is larger. Where in embodiments of the present invention requirements are put on the pitch, these advantageously should be fulfilled for the pitch in all directions. For example, in embodiments of the present invention, the pitch in all directions should fulfill the sub-wavelength limit requirement, e.g., pitch smaller than half the wavelength, when referring to a sub-wavelength grating.

Where in embodiments according to the present invention reference is made to a ratio of a low effective/refractive index or a high effective/refractive index region for a given pitch, reference is made to the fill factor for that region. Consequently, when in one pitch region more high effective/refractive material is present than low effective/refractive index material, the fill factor will be low. And when in one pitch region, more low effective/refractive index material is present than high effective/refractive index material, the fill factor will be high.

The present invention relates in a first aspect to an integrated photonic device comprising a substrate and an integrated waveguide formed on the substrate. This integrated waveguide is adapted for conducting radiation of a predetermined wavelength, e.g., the integrated waveguide is adapted in shape and dimensions to provide at least one optical mode for conducting at least one predetermined wavelength of radiation. The integrated photonic device further comprises a sub-wavelength grating optically connected to this integrated waveguide. The sub-wavelength grating may be integrated in the integrated waveguide. For example, the integrated waveguide may comprise a sub-wavelength grating portion or segment adapted for implementing the sub-wavelength grating. The sub-wavelength grating provides a first periodic variation of the refractive index in at least one first spatial direction. The integrated photonic device further comprises a diffracting grating arranged above or in the sub-wavelength grating for coupling radiation of the predetermined wavelength in and/or out of the integrated waveguide via the sub-wavelength grating. In some embodiments the diffracting grating is overlaying the sub-wavelength, whereas in other embodiments the diffracting grating is implemented in the sub-wavelength grating or even embedded therein. Examples of these different embodiments will be discussed further below. The diffracting grating provides a second periodic variation of the refractive index in at least one second spatial direction. The first periodic variation has a first pitch, e.g., a first spatial period, smaller than half of the predetermined wavelength, and the second periodic variation has a second pitch, e.g., a second spatial period, of at least half of the predetermined wavelength. Where in embodiments of the present invention reference is made to the diffracting grating, reference is made to the grating on top of the sub-wavelength grating. The diffracting grating will diffract radiation out of the light propagating plane. Where in embodiments of the present invention reference is made to the sub-wavelength grating, reference is made periodic features with size below the wavelength of the radiation in the waveguide, the sub-wavelength grating thus acting as a specific medium. Where in embodiments of the present invention reference is made to the predetermined wavelength, reference is made to the wavelength of the radiation as propagating in the waveguide.

It is an advantage of an integrated photonic device according to embodiments of the present invention that the device comprises a compound fiber-chip coupler for providing a large operating bandwidth. It is a further advantage that such compound fiber-chip coupler is tolerant to fabrication imperfections.

By way of illustration, embodiments of the present invention not being limited thereto, some standard and optional features and characteristics of embodiments of the present invention are further discussed below with reference to the drawings.

In FIG. 1, a cross-section of an integrated photonic device 1 according to embodiments of the first aspect of the present invention is shown. This integrated photonic device comprises a substrate 10. On the substrate 10 a buried oxide layer 11 is typically provided. On top of the buried oxide layer 11, waveguide material layer 12 is provided for forming an integrated waveguide 16. More generally, the integrated waveguide 16 may be positioned on top of the substrate 10, and intermediate layers may be present. In some embodiments, the integrated waveguide 16 is integrated in a semiconductor-on-insulator device. Such a semiconductor-on-insulator device may be a silicon-on-insulator device for example, in which case the buried oxide layer 11 could comprise a layer of silicon dioxide, and the waveguide material layer 12 would comprises a semiconductor layer.

Alternatively, other substrates allowing waveguide integration may also be provided. For example, substrates or substrates combined with intermediate layers may refer to a variety of forms and material systems such as for example low-index contrast waveguide platforms (e.g., polymer waveguides, glass/silica waveguides, $Al_xGa_{1-x}As$ waveguides, $In_xGa_{1-x}As_yP_{1-y}$ waveguides), high-index contrast waveguides (e.g., silicon-on-insulator, semiconductor membranes), or plasmonic waveguides (e.g., metal nano-particle arrays, metal layers), the last of which is also called Photonic Lightwave circuits (PLC).

The integrated photonic device 1 comprises an integrated waveguide 16, which is positioned in the waveguide material layer 12. This integrated waveguide 16 is adapted for conducting radiation (e.g., light) of a predetermined wavelength. The integrated waveguide 16 may for example be adapted in shape and dimensions to support at least one optical mode of radiation with at least one predetermined wavelength or in a predetermined wavelength range. The integrated waveguide 16 thus may be configured for efficiently conducting radiation in a spectral band having a central wavelength corresponding to the predetermined wavelength. For example, the integrated waveguide 16 may be conventional waveguide, e.g., a slab or wire waveguide.

The integrated waveguide 16 may comprise a silicon material, e.g., may comprise a polycrystalline silicon optical conductor, although embodiments are not limited thereto.

The integrated waveguide 16 may also comprise a non-resonant photonic structure for conducting and tightly confining radiation of the predetermined wavelength along the direction of the integrated waveguide. For example, the waveguide may comprise or consist of a linear periodic array of rectangular segments into a top silicon layer of a silicon-on-insulator wafer having a substrate layer, a buried oxide layer, and a top silicon layer, as also indicated above. The waveguide core may thus be a composite medium formed by interlacing the high-refractive-index segments with a material of a lower refractive index, which at the same time can be used as the cladding material. The refractive index of the core can thus be controlled lithographically by changing the volume fractions of the materials. In order to complete the integrated waveguide 16, also a further cladding layer (not shown) may be provided on top of the waveguide material layer 12. The integrated photonic device 1 further comprises a sub-wavelength grating 13 optically connected to the integrated waveguide 16, e.g., the sub-wavelength grating 13 may receive radiation of the predetermined wavelength from the integrated waveguide and/or may feed radiation of the predetermined wavelength into the integrated waveguide 16.

In particularly advantageous embodiments, the sub-wavelength grating 13 may be integrated in the integrated waveguide 16. For example, the integrated waveguide 16 may comprise a sub-wavelength grating portion or segment adapted for implementing the sub-wavelength grating 13. For example, the sub-wavelength grating 13 may comprise nanoholes and/or trenches formed in the material of the integrated waveguide 16 for locally lowering the effective refractive index with respect to radiation of the predetermined wavelength. The sub-wavelength grating 13 may be formed by depositing a layer on top of the buried oxide layer, with the pattern for the sub-wavelength being etched, thereby resulting in the first periodic variation. The etched holes of the pattern can then be filled with other index material. The sub-wavelength grating 13 may thus be obtainable by fully etching the waveguide material layer 12 in accordance with an etch pattern corresponding to the first periodic variation, e.g., etching the material layer 12 in accordance with an etch pattern corresponding to the first periodic variation down to the stopping layer, in this case the buried oxide layer. It is thus an advantage that the buried oxide layer can be used as stopping layer.

For embodiments in which the integrated waveguide consists of or comprises a non-resonant photonic structure for conducting and confining radiation of the predetermined wavelength, the sub-wavelength grating 13 may form part of this non-resonant photonic structure by locally varying the periodicity of the non-resonant structure to implement the sub-wavelength grating 13.

The sub-wavelength grating provides a first periodic variation of the refractive index in at least one first spatial direction. This first periodic variation may for example comprise a plurality of trenches arranged in a line pattern or a plurality of nanoholes arranged in a grid pattern. This first periodic variation has at least a first pitch, e.g., a first spatial period, smaller than half of the predetermined wavelength. The refractive index change induced by the periodic structures may be tuned by varying a pitch, a size, e.g., a diameter of a hole or a width of a trench, etc. Tuning techniques for tuning such parameters for obtaining the proper refractive index are known to the person skilled in the art. It is an advantage of embodiments of the present invention that refractive index control can be obtained without the need for changing the material technology. In this way, advantages of the low index contrast platform can be realized in a high refractive index platform, resulting in advantageous engineering of the device.

In embodiments according to the present invention, the first pitch may vary as function of location such as to match the optical power profile of the sub-wavelength grating 13 to the power profile of a mode of a fiber for feeding radiation into or receiving radiation from the integrated waveguide via the diffracting grating 14 and the sub-wavelength grating 13. In some embodiments, apodization may be implemented in a photonic integrated device 1 according to the present invention by providing a suitable gradient or nonlinear spatial dependency in the first pitch.

In embodiments according to the present invention, the first periodic variation may be adapted for providing a low effective refractive index region in a high refractive index material platform. For example, the integrated waveguide 16 may conduct radiation of the predetermined wavelength via a medium having a first effective refractive index, and the sub-wavelength grating 13 may conduct this radiation through a medium having a second effective refractive index being lower than the first effective refractive index. The first effective refractive index of the integrated waveguide may be a refractive index inherent to the material of the integrated waveguide core, but may also be an effective refractive index obtained by a non-resonant photonic structure of the waveguide, e.g., a periodic linear array of sub-wavelength features along the principal direction of the waveguide. For example, the first periodic variation may comprise nanoholes formed in the material of the integrated waveguide 16 for lowering the effective refractive index with respect to radiation of the predetermined wavelength.

It is an advantage of embodiments of the present invention that the second effective refractive index implemented by the sub-wavelength grating 13 allows the propagating mode of the radiation to be loosely confined. Therefore, the propagating mode can be injected or extracted by a weak grating, e.g., the diffracting grating 14.

Figure 11:
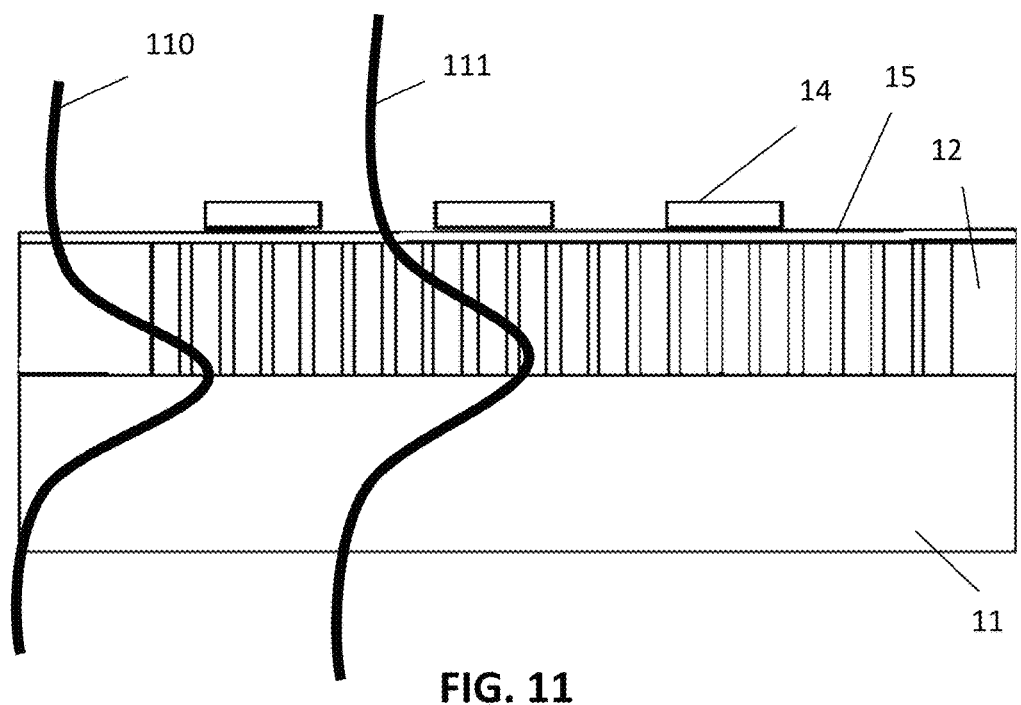
FIG. 11 illustrates the different optical modes and part of an integrated photonics device according to embodiments of the present invention.

The integrated photonic device 1 further comprises the diffracting grating 14 as arranged above or in the sub-wavelength grating 13 for coupling radiation of the predetermined wavelength in and/or out of the integrated waveguide 16 via the sub-wavelength grating 13. The diffracting grating 14 may overlay the sub-wavelength grating 13, may be provided in the sub-wavelength grating 13, or may even be embedded therein. In one example, the integrated photonic device 1 may comprise a waveguide cover layer 15, e.g., a silicon-dioxide layer provided over the integrated waveguide 16 and sub-wavelength grating 13, on which the diffracting grating 14 is provided, e.g., the waveguide cover layer 15 may advantageously form the top cladding for the integrated waveguide 16 and an etching stop layer for etching the diffracting grating 14 provided thereon. In FIG. 11, the device 1 is shown together with the optical modes, whereby the optical mode 110 indicates the optical mode in the waveguide without sub-wavelength grating and the optical mode 111 indicates the optical mode that stretches in the sub-wavelength region. As can be seen from FIG. 11, the waveguide cover layer 15, here being the etching stop layer, advantageously is sufficiently thin so that the mode tails can reach the top grating. If the stop layer would be very thick, then it would prevent the mode tails from reaching the diffraction grating.

The diffracting grating 14 provides a second periodic variation of the refractive index in at least one second spatial direction, e.g., in a second spatial direction being the same direction as the first spatial direction. The second periodic variation has a second pitch, e.g., a second spatial period, of at least half of the predetermined wavelength. Thus, the diffracting grating 14 may be a conventional grating, e.g., a metal line grating provided over the sub-wavelength grating.

In embodiments according to the present invention, the second pitch may vary as function of location such as to match the optical power profile of the diffracting grating 14 to the power profile of a mode of a fiber for feeding radiation into or receiving radiation from the integrated waveguide via the diffracting grating 14 and the sub-wavelength grating 13. Apodization may be implemented in a photonic integrated device 1 according to the present invention by providing a suitable gradient or nonlinear spatial dependency in the second pitch.

Figure 6:
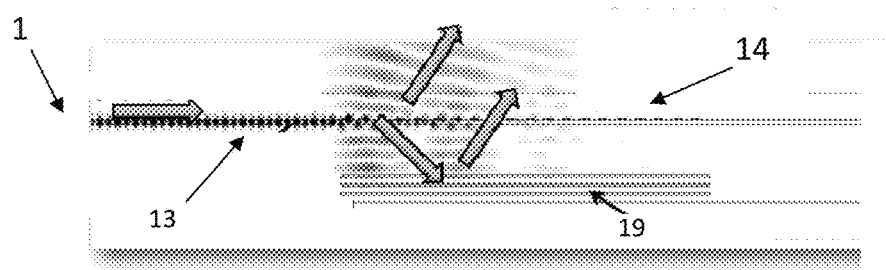
FIG. 6 shows a simulation of radiation propagation through a device comprising a distributed Bragg mirror according to embodiments of the present invention.

An integrated photonic device 1 according to embodiments may furthermore comprise a reflective element 19, e.g., as shown in FIG. 6 (for the sake of convenience some intermediate layers are not explicitly shown), arranged between the substrate 10 and the sub-wavelength grating 13 for reflecting a downward diffracted portion of the radiation of the predetermined wavelength such as to constructively interfere with an upward diffracted portion of the radiation of the predetermined wavelength. For example, the reflective element 19 may comprise a distributed Bragg mirror.

Figure 2:
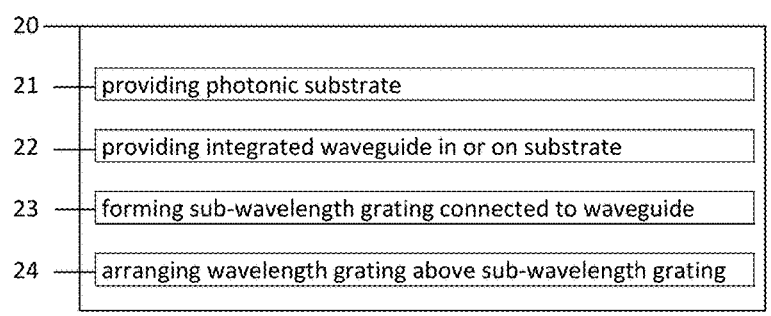
FIG. 2 shows a method according to embodiments of the present invention.

In a second aspect, the present invention relates to a method for manufacturing a photonic integrated device, e.g., a photonic integrated device according to the first aspect of the present invention. An exemplary method 20 for manufacturing such photonic integrated device is shown in FIG. 2. This method comprises providing 21 a substrate 10, e.g., a silicon substrate, having a buried oxide layer 11 thereon. On the buried oxide layer 11 a waveguide material layer 12 is present. The method further comprises providing 22 an integrated waveguide 16 in the waveguide material layer 12, e.g., by etching the waveguide material layer 12. This integrated waveguide 16 is implemented such as to be adapted for conducting radiation of a predetermined wavelength. The method 20 further comprises forming 23 a sub-wavelength grating 13 optically connected to the integrated waveguide, in which the sub-wavelength grating provides a first periodic variation of the refractive index in at least one first spatial direction. The method 20 also comprises arranging 24 a diffractive grating 14 above or in the sub-wavelength grating for coupling light of the predetermined wavelength in and/or out of the integrated waveguide 16 via the sub-wavelength grating 13. The diffracting grating 14 provides a second periodic variation of the refractive index in at least one second spatial direction. The first periodic variation has a first pitch smaller than half of the predetermined wavelength, while the second periodic variation has a second pitch of at least half of the predetermined wavelength. Forming 23 the sub-wavelength grating 13 may comprise fully etching a periodic pattern in the waveguide in the waveguide material layer in accordance with an etch pattern corresponding to this first periodic variation.

Figure 5:
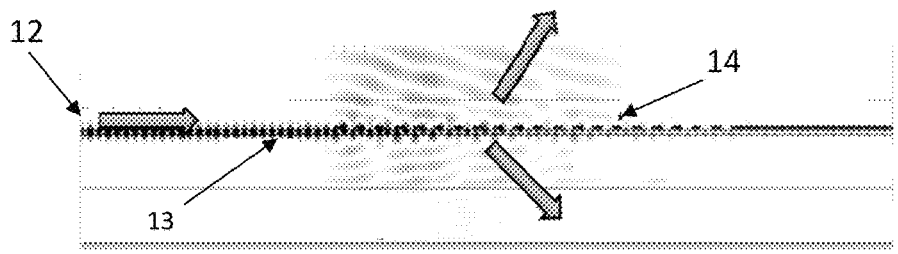
FIG. 5 shows a simulation of radiation propagation through a device according to embodiments of the present invention.

For a first example relating to embodiments of the present invention, Effective Medium Theory was used for simulating a photonic device. The sub-wavelength grating which defines a low effective index region was replaced by an artificial material with corresponding bulk refractive index. A sandwich layer of $SiO_2$ and poly-Si was used for the simulation. FIG. 5 shows the simulated system, comprising a composite substrate comprising a base substrate 10 having a silicon dioxide layer 11 acting as the bottom cladding for the waveguide structure 16.

Figure 3:
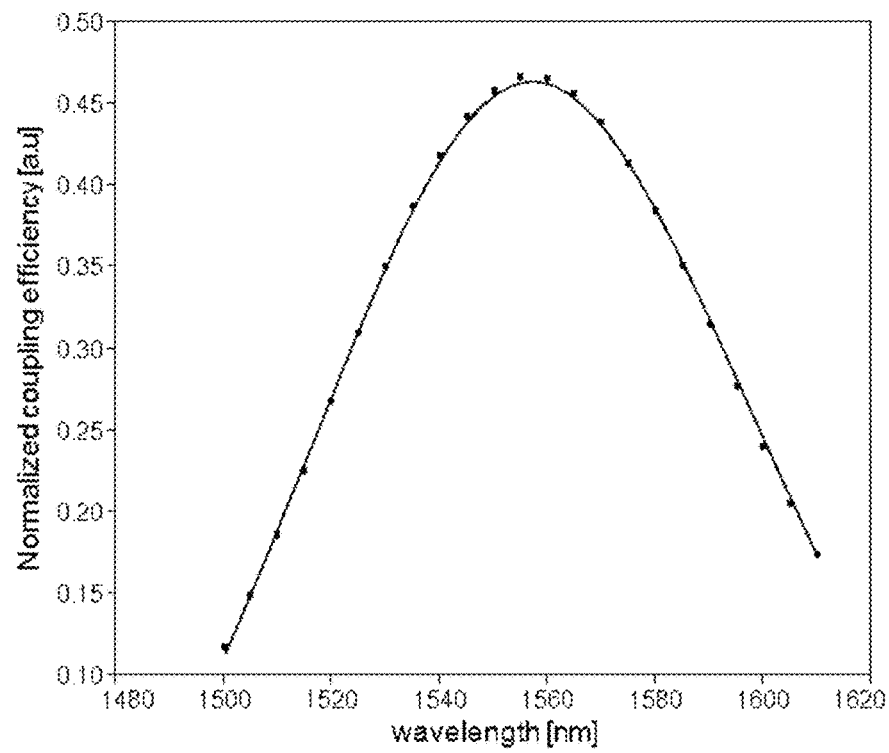
FIG. 3 shows radiation coupling efficiency of a device according to embodiments of the present invention.

FIG. 3 shows the coupling efficiency of the structure as a function of wavelength. The bandwidth $\Delta\lambda_{1\,dB}$ of the grating coupler depends on the effective index $n_{eff}$ of the sub-wavelength grating according to the following formula:

$$\Delta\lambda_{1dB} \approx \frac{\lambda_0 n_c \cos\theta_0}{n_{eff} - n_c \sin\theta_0}$$

where $\lambda_0$ is the desired peak wavelength, $\theta_0$ is the design angle of diffraction, and $n_c$ is the refractive index of the cladding material.

Therefore, by refractive index engineering of the effective medium, the bandwidth of the coupler can be made larger by reducing the effective medium index of the sub-wavelength grating.

The peak wavelength of the fiber coupler is influenced by the thickness and fill-factor, e.g., line/space-width, of the sub-wavelength grating and of the diffracting grating 14. Both these patterns may be defined by fully etched features relying on an etch-stop layer. The sub-wavelength grating 13 has the buried oxide (BOX) layer of the SOI substrate as an etch-stop layer. Plasma based wafer-scale etch processes are used. Whereas plasma non-uniformity over the wafer will in principle result in etch depth non-uniformity, by using a stop layer, part of the wafer where the etch was quicker will not etch any more once the stop layer is reached while a slow etch region will continue etching. In this way, the etch depth non-uniformities are decreased or avoided. The etch process typically has high selectivity between layer 15 and layer 14. Typically, the non-uniformity that is obtained in etch depth is of the order of 8% to 10%. It is to be noticed that other techniques for controlling etch depth non-uniformity also may be applied. For the diffracting grating, an additional etch-stop layer 15 is provided. Therefore, etch depth non-uniformities induced by the etch process may be reduced or removed.

Figure 4:
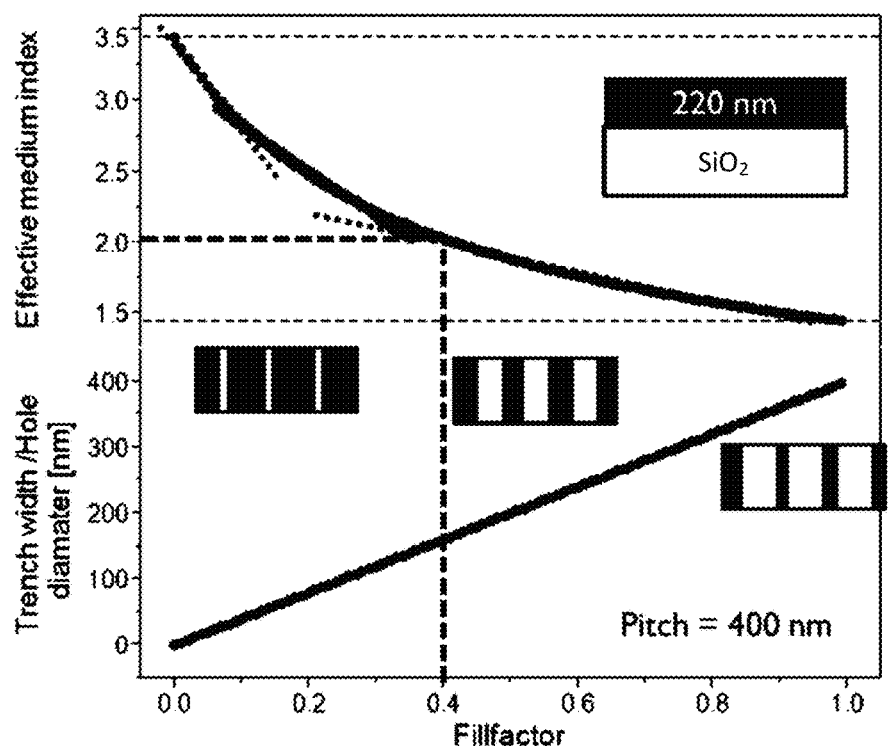
FIG. 4 illustrates effective medium refractive index and trench width or hole diameter as function of fill factor in a device according to embodiments of the present invention.

Tolerance to fill factor variation may depend on the operating region. For a large fill factor, e.g., a low effective medium index, the structure may be relatively more robust compared to low-fill factor, e.g., corresponding to a high effective medium index. This is illustrated by FIG. 4.

Figure 7:
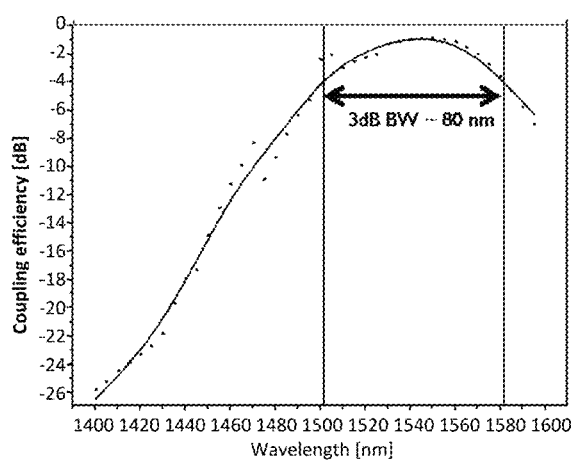
FIG. 7 shows radiation coupling efficiency of a device comprising a distributed Bragg mirror according to embodiments of the present invention.

The coupling efficiency of the coupler in this first example can be further increased by reflecting the downward diffracted light such as to constructively interfere with the upward diffracted light. This can for example be achieved by a conventional Distributed Bragg Mirror (DBR). FIG. 6 and FIG. 7 show a simulation of such coupler with a bottom distributed Bragg mirror 19 and the corresponding simulated coupling efficiency improvement from 45% to 80% for a 3 dB bandwidth of 80 nm, respectively.

Figure 8:
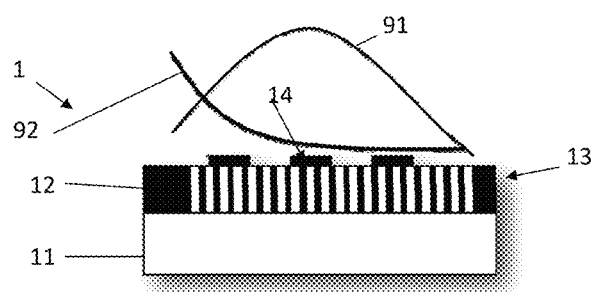
FIG. 8 shows the optical power distribution of a single mode optical fiber and of a grating coupling in a device according to embodiment of the present invention.
Figure 9:
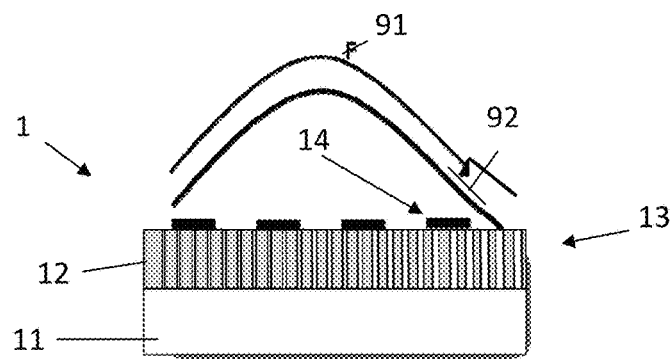
FIG. 9 shows the optical power distribution of a single mode optical fiber and of an apodized grating coupling in a device according to embodiment of the present invention.
Figure 10:
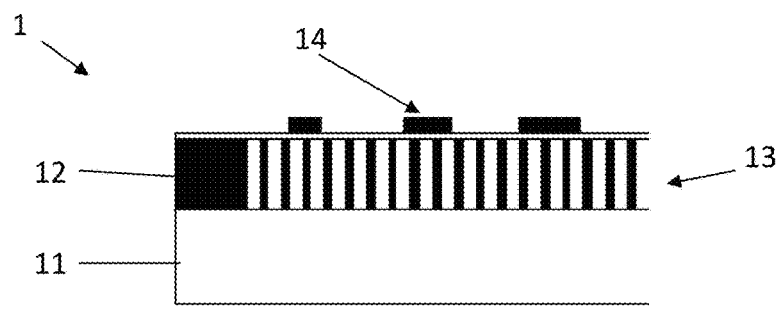
FIG. 10 illustrates an alternative means of apodization for a device according to embodiments of the present invention.

A coupler according to the previous example may generate an exponentially decaying optical power, which is not ideal for coupling to an optical fiber, as illustrated schematically in FIG. 8 by the fiber mode profile 91 and the optical power profile 92 of scattering off the grating. Therefore, a grating period of the coupler may be apodized to create a suitable profile, such as for example a Gaussian profile, such that an improved coupling between an optical fiber and the coupler can be achieved, as illustrated in FIG. 9 and FIG. 10. In other words, by decoupling the apodization and the coupling, the efficiency of the radiation power transfer at the wavelength from the sub-wavelength coupler via the diffracting grating to the fiber is improved, resulting in an overall more efficient fiber chip optical coupler.

A photonic integrated device according to embodiments may be apodized to match the coupling optical power profile to an incident fiber mode profile by locally varying the period of the sub-wavelength grating structure, e.g., as shown in FIG. 9. Thus, a local gradient in the effective refractive index of the sub-wavelength grating medium is provided, while periodicity of the diffracting grating, e.g., the overlay grating, is kept uniform. Since the refractive index gradually decreases, the confinement of light in the waveguide is also gradually reduced. This gradual decrease in refractive index may thus result in a gradual increase in diffraction, and therefore can implement a suitable profile, such as for example a Gaussian-like mode pattern for matching a fiber mode. Alternatively or additionally, the periodicity of the diffracting grating may vary locally, as shown in FIG. 10, as is known for apodization of conventional grating couplers.

Figure 13:
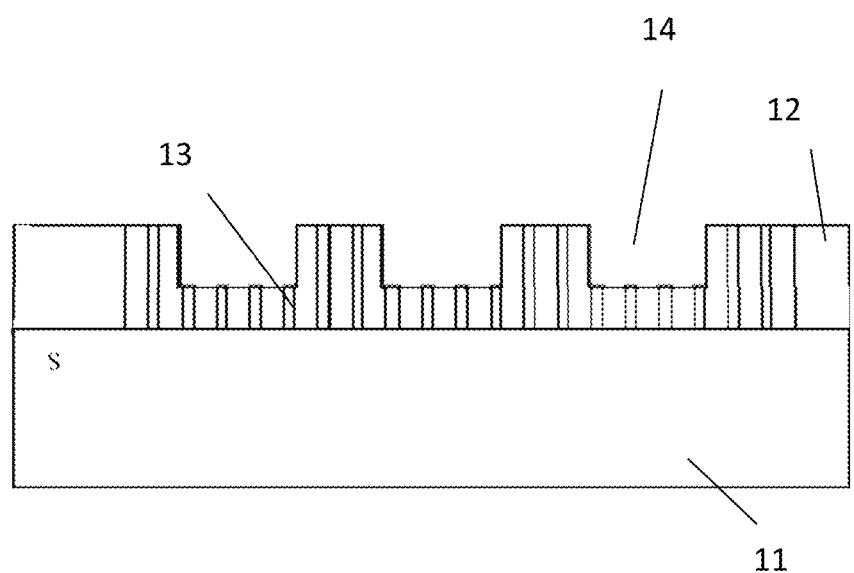
FIGS. 13 and 14 schematically illustrate that the diffractive grating can be integrated or embedded in the sub-wavelength grating, according to embodiments of the present invention.

Although in the above examples and embodiments, the diffracting grating has been shown as an overlay for the sub-wavelength grating, according to some embodiments of the present invention, the diffracting grating may also be provided in the sub-wavelength grating, i.e., as a grating etched in the sub-wavelength grating. Although this also allows for bandwidth engineering, the latter nevertheless has the disadvantage that it is less manufacturing tolerant. An example of such an embodiment is shown in FIG. 13, whereby the diffracting grating thus is etched in the sub-wavelength grating. The diffracting grating thereby has a larger pitch than the sub-wavelength grating. In the present example, the device was based on a silicon-on-insulator but embodiments of the present invention are not limited thereto.

Figure 14:
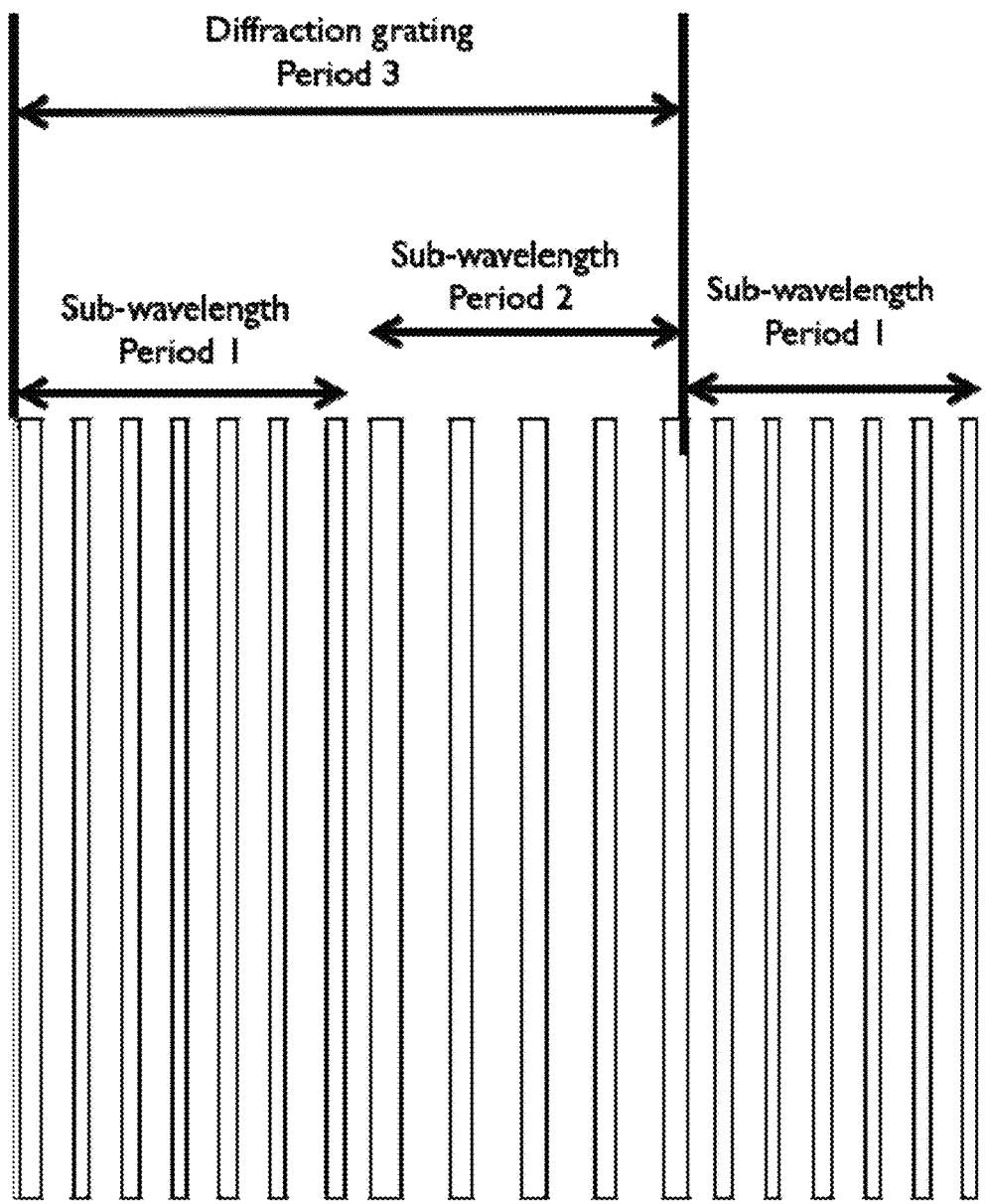

In another set of embodiments, the diffracting grating also is provided in the sub-wavelength grating, but instead of using a partially etched grating as the diffracting grating, the diffracting grating is embedded in the sub-wavelength grating. The sub-wavelength grating as such has a periodic variation of a first pitch. In an embedded grating, a second periodic variation of a second pitch is introduced in the same grating. In other words, in an embedded grating, a superposition of two periodic variations is introduced. An example of an embedded grating is shown in FIG. 14, embodiments not being limited thereto. As can be seen on the one hand sub-wavelength grating portions with a first period are present, but these are alternated with sub-wavelength grating portions having another period. By substantially differing the first period and the further period, regions of low-effective refractive index and regions of high effective refractive index can be generated. The alternation of the first and second sub-wavelength grating portions (and thus of regions with low respectively high effective refractive index) occurs with a third period. The first and second period both correspond with first periodic variations as typically occurring in sub-wavelength, whereas the third period corresponds with a second periodic variation as typically occurring for the diffracting grating. The embedded grating can be implemented in a photonics device as described above as alternative to a sub-wavelength grating and a diffractive grating overlaying the sub-wavelength grating.

What is claimed is:

1. An integrated photonic device comprising:
 a substrate;
 an integrated waveguide formed on the substrate, the integrated waveguide being configured to conduct light of a predetermined wavelength;

a sub-wavelength grating integrated in the integrated waveguide, the sub-wavelength grating providing a first periodic variation of a refractive index in the integrated waveguide in at least one first spatial direction, wherein the first periodic variation has a first pitch that is less than half of the predetermined wavelength; and a diffracting grating for at least one of (1) coupling light of the predetermined wavelength into the integrated waveguide via the sub-wavelength grating or (2) coupling light of the predetermined wavelength out of the integrated waveguide via the sub-wavelength grating, the diffracting grating (i) providing a second periodic variation of the refractive index in at least one second spatial direction, wherein the second periodic variation has a second pitch that is at least half of the predetermined wavelength and (ii) being at least one of:

(a) arranged above the sub-wavelength grating with respect to the substrate; or (b) partially etched in the sub-wavelength grating,
wherein the sub-wavelength grating is etched into the integrated waveguide to a first depth with respect to the substrate and the diffracting grating is partially etched into the sub-wavelength grating to a second depth with respect to the substrate,
wherein the second depth is less than the first depth with respect to the substrate.

2. The integrated photonic device of claim 1, wherein the sub-wavelength grating comprises at least one of (i) a plurality of nanoholes formed in the material of the integrated waveguide layer for locally lowering an effective refractive index with respect to light of the predetermined wavelength, or (ii) a plurality of trenches formed in the material of the integrated waveguide layer for locally lowering the effective refractive index with respect to light of the predetermined wavelength.

3. The integrated photonic device of claim 1, wherein the first pitch varies as a function of location so as to match an optical power profile of the sub-wavelength grating to a power profile of a mode of a fiber, the fiber being configured for at least one of (1) feeding light into the integrated waveguide via the diffracting grating and the sub-wavelength grating or (2) receiving light from the integrated waveguide via the diffracting grating and the sub-wavelength grating.

4. The integrated photonic device of claim 1, wherein the second pitch varies as a function of location so as to match an optical power profile of the diffracting grating to a power profile of a mode of a fiber, the fiber being configured for at least one of (1) feeding light into the integrated waveguide via the diffracting grating and the sub-wavelength grating or (2) receiving light from the integrated waveguide via the diffracting grating and the sub-wavelength grating.

5. The integrated photonic device of claim 1, further comprising a reflective element arranged between the substrate and the sub-wavelength grating, the reflective element configured to reflect a downward diffracted portion of light of the predetermined wavelength so as to constructively interfere with an upward diffracted portion of light of the predetermined wavelength.

6. The integrated photonic device of claim 5, wherein the reflective element comprises a distributed Bragg mirror.

7. The integrated photonic device of claim 1, wherein the sub-wavelength grating is configured to conduct light of the predetermined wavelength through a medium having a waveguide effective refractive index, and wherein the first periodic variation is configured to provide an effective refractive index that is less than the waveguide effective refractive index.

8. The integrated photonic device of claim 1, wherein the substrate is part of a semiconductor-on-insulator, and wherein the integrated waveguide is formed in the semiconductor layer of the semiconductor-on-insulator layer.

9. The integrated photonic device of claim 8, wherein the semiconductor layer is a silicon layer, and wherein the integrated waveguide is a silicon waveguide.

10. The integrated photonic device of claim 1, wherein the diffracting grating is a metal line grating.

11. An integrated photonic device comprising:
a substrate;
an integrated waveguide formed on the substrate, the integrated waveguide being configured to conduct light of a predetermined wavelength;
a sub-wavelength grating integrated in the integrated waveguide, the sub-wavelength grating providing a first periodic variation of a refractive index in the integrated waveguide in at least one first spatial direction, wherein the first periodic variation has a first pitch that is less than half of the predetermined wavelength; and
a diffracting grating for at least one of (1) coupling light of the predetermined wavelength into the integrated waveguide via the sub-wavelength grating or (2) coupling light of the predetermined wavelength out of the integrated waveguide via the sub-wavelength grating, the diffracting grating (i) providing a second periodic variation of the refractive index in at least one second spatial direction, wherein the second periodic variation has a second pitch that is at least half of the predetermined wavelength, and (ii) being arranged above the sub-wavelength grating with respect to the substrate, wherein the diffracting grating is arranged above a top surface of the integrated waveguide.

12. The integrated photonic device of claim 11, wherein the diffracting grating being arranged above the sub-wavelength grating comprises the diffracting grating overlaying the sub-wavelength grating.

* * * * *